Oct. 12, 1954
A. J. HOOD
2,691,368
BARBECUE UNIT
Filed March 28, 1951
3 Sheets-Sheet 1
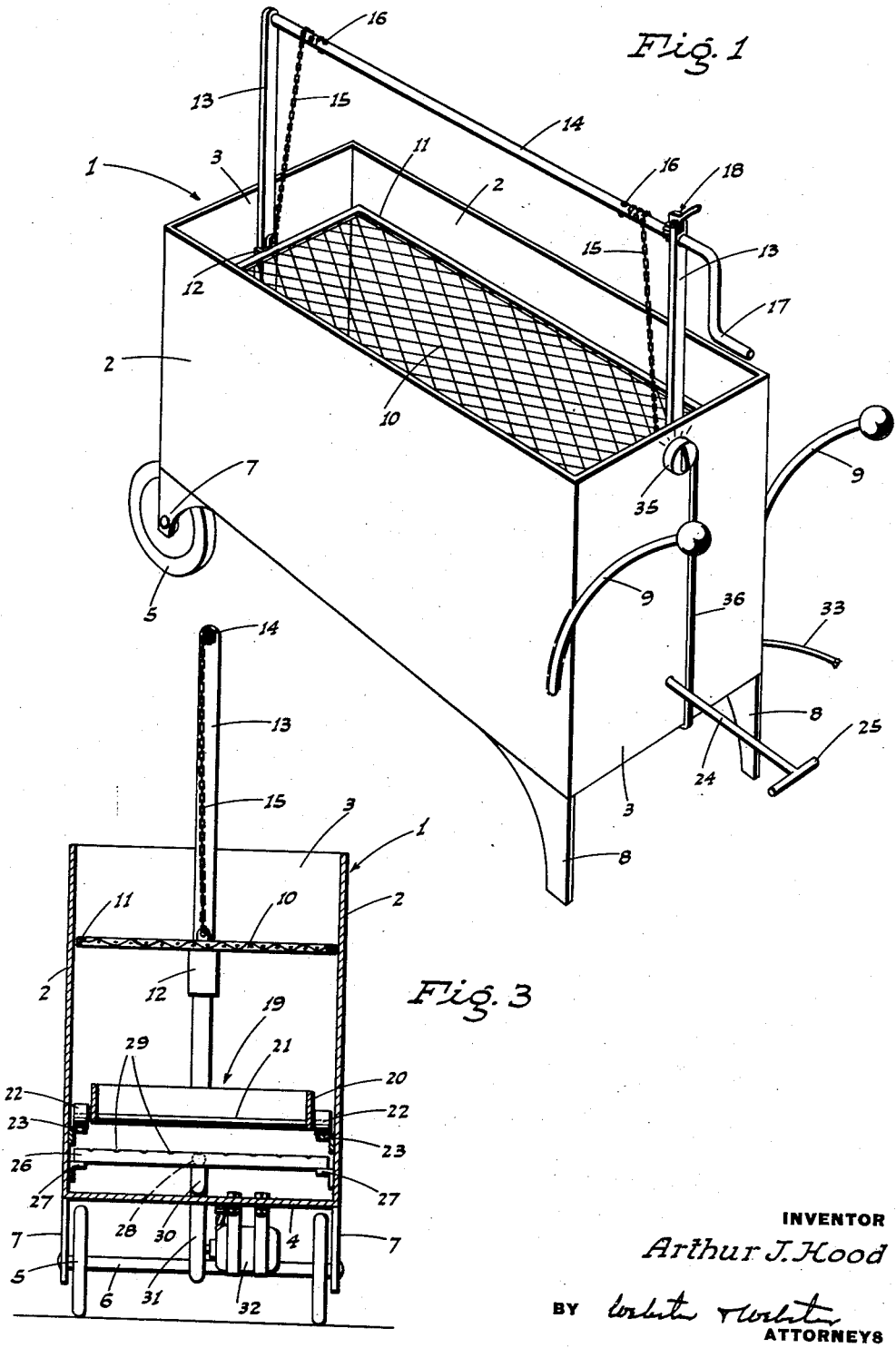
INVENTOR
Arthur J. Hood
BY
ATTORNEYS

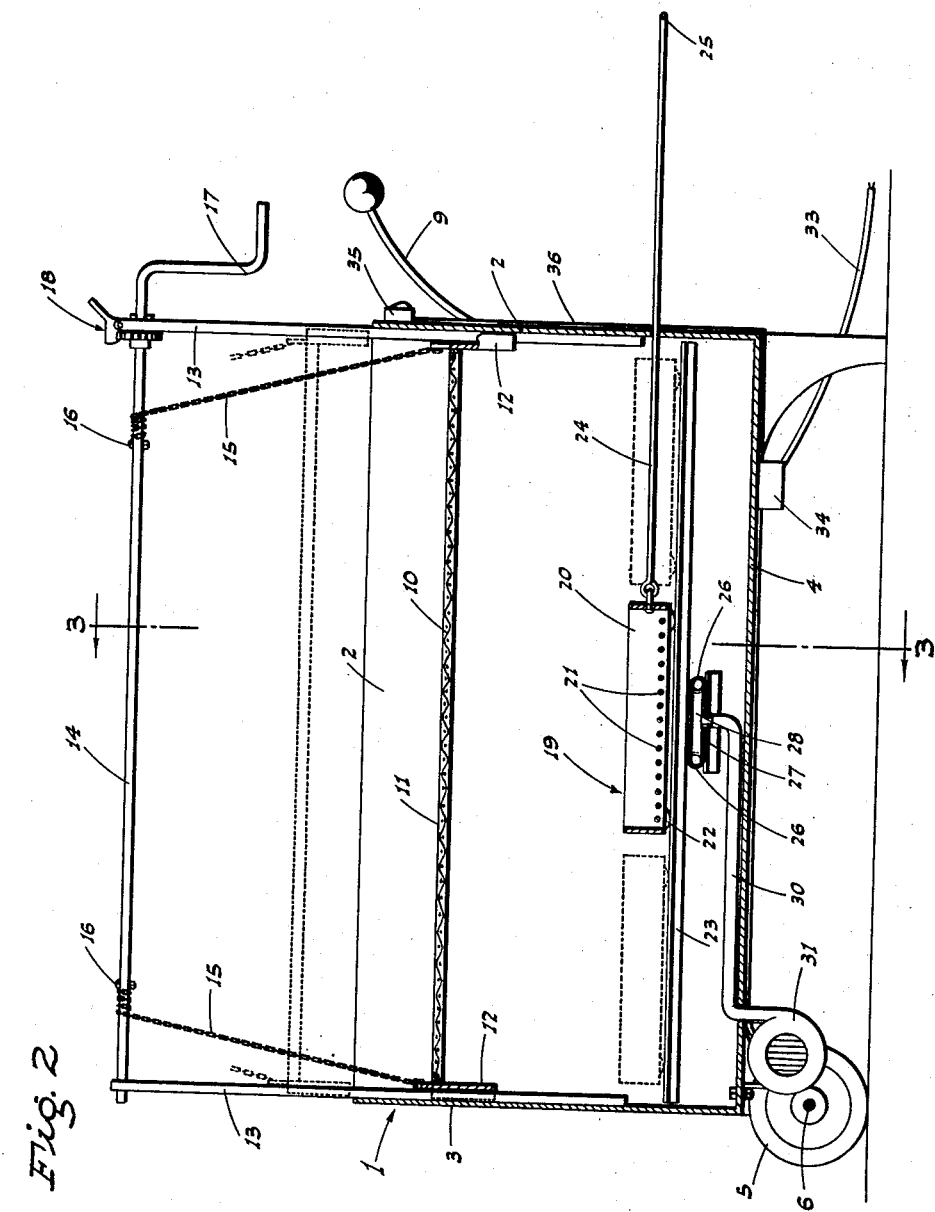

Oct. 12, 1954　　　　　　A. J. HOOD　　　　　　2,691,368
BARBECUE UNIT

Filed March 28, 1951　　　　　　　　　　　　　　3 Sheets-Sheet 3

INVENTOR
Arthur J. Hood
BY
ATTORNEYS

Patented Oct. 12, 1954

2,691,368

UNITED STATES PATENT OFFICE 2,691,368

BARBECUE UNIT

Arthur J. Hood, Reno, Nev.

Application March 28, 1951, Serial No. 217,950

5 Claims. (Cl. 126—25)

This invention is directed to, and it is a major object to provide, an improved barbecue unit; the features of novelty being especially adapted, but not limited, for use in a barbecue unit of portable type.

Another major object is to provide a novel barbecue unit which includes a food supporting grill and a fire grate below the grill; the grill being vertically adjustable and the fire grate being relatively short and longitudinally adjustable, both whereby the cooking of food on said grill can be closely controlled.

A further object of the invention is to provide novel means supporting the grill and the fire grate, in the box-like body of the unit, for said vertical and longitudinal adjustment, respectively; such adjustments being made manually, and conveniently.

An additional object of the invention is to embody novel, force-fed draft means in the barbecue unit whereby to accelerate initial burning, to coals, of the fire material such as charcoal; the draft means being arranged for manual regulation of its intensity as may be required, during use of the barbecue unit, to maintain the bed of coals in the grate at proper heat.

It is also an object of the invention to provide a barbecue unit which is designed for ease and economy of manufacture; the unit being of relatively simple structure, and one which is convenient to use.

A separate object of this invention is to provide, in a modified embodiment, a barbecue unit formed as an oven, and wherein the bed of coals is supported directly in the oven and maintained live by a force-fed draft.

Still another object of the invention is to provide a practical and reliable barbecue unit, and yet one which will be exceedingly effective for the purpose for which it is designed.

These objects are accomplished by means of such structure and relative arrangement of parts as will fully appear by a perusal of the following specification and claims.

In the drawings:

Fig. 1 is a perspective view of the improved barbecue unit.

Fig. 2 is a longitudinal sectional elevation of the same.

Fig. 3 is a cross section on line 3—3 of Fig. 2.

Figure 4:
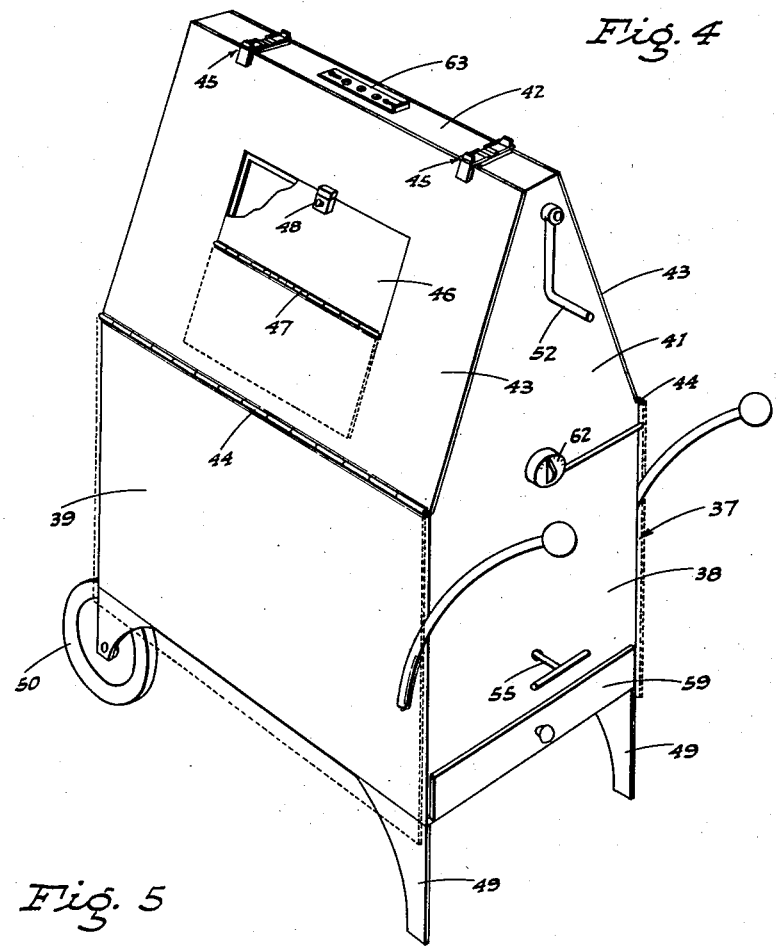
Fig. 4 is a perspective view of a modification of the barbecue unit.

Referring now more particularly to the characters of reference on the drawings, and particularly at present to Figs. 1-3 inclusive, the barbecue unit comprises an upstanding, somewhat elongated box-like body, indicated generally at 1; such body being rectangular in plan, open-topped, and includes sides 2, ends 3, and a bottom 4.

The body 1 is supported at the front end by transversely spaced wheels 5 on an axle 6 carried in brackets 7.

At the rear end the body 1 is supported by transversely spaced legs 8, and transversely spaced handles 9 extend upwardly and rearwardly from the adjacent end portion of the body for movement of the barbecue unit manually from place to place.

A horizontal, food supporting grill 10 is symmetrical to, and engages in, the body 1 from the top thereof, with a relatively easy running fit; the grill 10 including a border frame 11. At the ends and centrally thereof, the border frame 11 is fitted with outwardly opening, vertical channel guides 12 which run on posts 13 affixed to the inner face of the adjacent ends 3 of the body; such posts extending a substantial distance into the box-like body 1, and also projecting a substantial distance thereabove.

Mounted as above, the grill 10 is vertically adjustable in the box-like body 1; such grill being suspended for such adjustment in the following manner:

A longitudinal shaft 14 is turnably mounted in connection with the upper ends of the posts 13 and extends therebetween, and suspension chains 15 are anchored at their lower ends to the guides 12 and thence extend upwardly to, and wind about, the shaft 14; the chains at their upper end being anchored to said shaft, as at 16.

At the end above the handles 9, i. e. at its rear end, the shaft 14 is formed with a hand crank 17, and the adjacent post 13 is fitted, at its upper end, with a releasable, ratchet lock unit 18; the latter serving to normally prevent rotation of the shaft 14 so as to maintain the grill 10 in a selected position of vertical adjustment.

Spaced above the bottom 4, and some distance below the grill 10, the barbecue unit includes a grate, indicated generally at 19; such grate being rectangular in plan but considerably shorter than the grill 10.

The grate 19 comprises a rectangular frame 20, and a plurality of grate bars 21 which extend transversely in spaced relation between opposite sides of said frame 20.

On opposite sides the rectangular frame 20 is fitted, exteriorly thereof, with longitudinally spaced rollers 22 which run on horizontal rail forming flanges 23 secured to the sides 2 on the inner face thereof. The rail forming flanges 23 run substantially the full length of the box-like body 1, whereby the grate 19 is adjustable lengthwise in such box from end to end thereof. To permit such adjustment when the barbecue unit is in operation, a push-pull rod 24 is connected to one end of the grate 19, and thence extends longitudinally through the related end 3 of the box-like body 1. The rod 24 extends some distance out of the body 1 and at its outer end such rod is formed with a handle 25. By simply pushing or pulling the rod 24 by the handle 25 the grate 19 can be adjusted longitudinally beneath the grill 10. The fire material, such as burning charcoal, is retained in the grate 19, and as the latter is longitudinally adjustable, as above, such grate may be set at any selected position beneath the grill 10, or moved lengthwise with respect thereto as cooking conditions may require. For example, if only a small quantity of food is being cooked on one area of the grill 10, the grate 19 may be adjusted to a position directly under such area. One the other hand, if a relatively larger quantity of food is being cooked and extends along substantially the length of the grill 10, the grate 19 can be moved back and forth step by step as the cooking progresses.

Thus, the longitudinal adjustment of the grate 19, together with the vertical adjustment of the grill 10, makes possible a most effective regulation or control of the cooking of food on said grill.

Another important feature of the present invention is the provision of a regulated force-fed draft for the fire material carried in the grate 19. This is accomplished as follows:

A pair of endless, draft tubes 26 extend in spaced relation transversely between the sides 2 at a point centrally between the ends 3; such draft tubes being supported by flanges 27. The draft tubes 26 are connected, intermediate their ends, by a cross tube 28, and each tube 26 has a row of perforations 29 extending full length in the top thereof. A flow of air is directed into the cross tube 28, and consequently into the tubes 26 and upwardly out of the perforations 29, from a duct 30 which runs forwardly along the bottom 4 of the body to connection with a blower 31 suspended from said bottom at the front end of the unit. The blower 31 is driven by an electric motor 32, and said blower and motor are mounted at the front end of the unit between the wheels 5, thus being wholly out of the way and not in the least hindering easy manipulation of the barbecue unit from place to place.

The electric motor 32 is energized by means of an electric supply cord 33 which leads into a terminal box 34 on the under side of the bottom 4; speed control of said motor being accomplished through the medium of a rheostat 35 at the top of the end 3 adjacent the handles 9; a circuit cord 36 leading from the rheostat 35 to the terminal box 34. By adjusting the rheostat 35 the volume of air fed upwardly out of the draft tubes 26 is conveniently controlled.

When the described barbecue unit is to be used, the fire material is placed in the grate 19 and the latter is adjusted to a position directly over the draft tubes 26, whereby when the fire material is lighted the draft from below causes such material to quickly burn down to coals.

Thereafter, the draft fed into the body 1 from the draft tubes 26 can be reduced and regulated as may be necessary; it being recognized that the only draft with which the body is provided is that delivered from the draft tubes 26.

With the vertical adjustment of the grill 10 and the longitudinal adjustment of the grate 19, selectively, together with the control of the draft, the barbecue unit can be used most effectively for perfection of cooking barbecued foods. Also, by selective longitudinal adjustment of the grate, the pieces of food on different sections of the grill can be cooked to taste; i. e., rare, medium, or well done.

Figure 5:
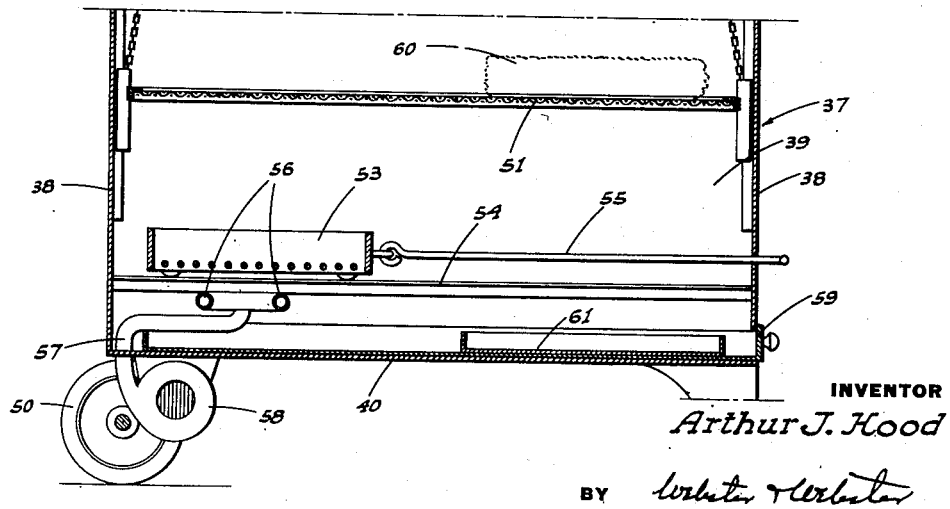
Fig. 5 is a fragmentary longitudinal sectional elevation of such modification.

In Figs. 4 and 5 the invention is disclosed in an embodiment which provides a barbecue oven.

Here the box-like body, indicated generally at 37, is fully enclosed; such body including ends 38; sides 39; and a bottom 40. Additionally, the ends 38 are extended upwardly above the sides 39 in substantially triangular form, as at 41; such upper portions 41 of the ends being connected by a relatively narrow, longitudinal top plate 42.

The enclosure of the body 37 is completed by flap-like doors 43; such doors being full length and spanning between the upper edges of the sides 39 and the top plate 42.

The doors 43 are hinged along their lower edges, as at 44, to the upper edges of the sides 39, while at the top such doors are releasably latched, as at 45, to the top plate 42. With this arrangement the doors 43 are swingable from a normally upstanding closed position, as shown in Fig. 4, to a down-swung or depending open position, as shown in dotted lines in such figure.

One of the doors 43 is formed, centrally thereof, with an access window 46 hinged, as at 47, along its lower edge for downward opening motion; such window normally being maintained closed by a catch 48.

With the foregoing arrangement of the body 37, the same may be used fully enclosed as a barbecue oven, or with one or both of the doors 43 open to permit of use of the unit much in the same manner as the embodiment of Figs. 1–3 inclusive.

As in the previous embodiment, the body 37 is supported by legs 49 and wheels 50 spaced lengthwise of said body.

Within the body 37 the structural arrangement is generally as before, including a vertically adjustable, full length grill 51, which adjustment is accomplished through the medium of an exteriorly disposed crank 52. Below the grill 51 the relatively short grate 53 is adjustable along rails 54 by a push-pull rod 55 having an outside handle.

In this embodiment the draft tubes 56 are disposed in position to cooperate with the grate 53 when the latter is in a position at one end of the body 37; the draft tubes 56 being connected by a duct 57 with a blower 58 mounted beneath the body.

A longitudinal, full-length, drawer-type ash receiver 59 is disposed in the body 37 on the bottom thereof, being adapted to pull out through one end 38 of said body.

When the present embodiment of the barbecue unit is in use as an oven with both of the doors 43 closed, the grate 53, with the bed of coals therein, is disposed directly over the draft tubes 56. The food 60 to be roasted is disposed on the grill 51 adjacent the opposite end of the body, whereby drippings from the food—for use as gravy—may be caught in a drip pan 61 seated in the receiver 59 at the end of the body opposite the grate 53. The drip pan 61 may be removed from the device merely by pulling out the receiver 59.

As the bed of coals carried by the grate 53 is disposed directly in the oven compartment, not only is roasting accomplished effectively, but a most excellent flavor is imparted to the food.

Although the body 37 is enclosed when in use as an oven, the bed of coals in the grate 53 is maintained live by reason of the force-fed draft from the tubes 56; the speed of the blower 58 being controlled, as before, by a rheostat 62.

The temperature within the body 37 is regulated by control of the blower 58, as well as by an adjustable slide-type vent or damper 63 on the top plate 42; the damper also serving to permit of the escape of fumes from the body.

If it is desired to gain access to the food 60 during cooking thereof, for the purpose of turning such food or basting the same, it is not necessary to open either of the doors 43; access being had merely by opening the small window 46.

Upon those occasions when the barbecue unit of this embodiment is to be used for open or non-oven type barbecuing, the doors 43 are unlatched and swung down to their open position, opening the top of the body and exposing the grill 51. Alternatively, if it is windy, the barbecue unit may be used with one door 43 open and the other closed.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A barbecue unit comprising a support, a grill, means securing the grill in connection with the support, a grate below the grill, means mounting the grate on the support, and means below the grate including a fixed transversely extending and relatively narrow passage member having top openings operative to deliver a force-fed draft upwardly; the grill being elongated, and the grate being substantially shorter than the grill and means mounting the grate for longitudinal adjustment in the body so that it may be disposed in different positions lengthwise of the body; the passage member being disposed in the body at a position such that the grate in one position of adjustment will be over said member and in another position of adjustment will be clear of said member.

2. A barbecue unit comprising a body of rectangular form in plan and including upstanding side and end walls, a horizontal grill mounted in the body, a grate mounted in the body below the grill, and a source of upwardly directed draft mounted in the body below the grate; the grill being vertically adjustable, and the grate longitudinally adjustable.

3. A barbecue unit, as in claim 2, in which the grate is of limited length relative to the body, and the source of draft being disposed intermediate the ends of said body.

4. A barbecue unit comprising an elongated body of rectangular form in plan and including upstanding side and end walls, a grill symmetrical to and supported in the body, a grate, the latter being relatively short as compared to the body, means mounting the grate in the body for longitudinal adjustment therein below the grill, means to effect such adjustment of the grate, an electric motor driven blower mounted on and outside the body, draft discharge means in the body below the path of movement of the grate, and an air duct between the blower and said draft discharge means.

5. A barbecue unit, as in claim 4, in which said draft discharge means includes a transverse tube having top perforations therein.

References Cited in the file of this patent

UNITED STATES PATENTS

| Number | Name | Date |
|---|---|---|
| 145,491 | Dibble | Dec. 16, 1873 |
| 580,753 | Barnard | Apr. 13, 1897 |
| 1,194,373 | Fralick | Aug. 15, 1916 |
| 1,211,536 | Buchholtz | Jan. 9, 1917 |
| 1,231,594 | Fullard | July 3, 1917 |
| 1,258,245 | Riegel | Mar. 5, 1918 |
| 1,472,178 | Klein | Oct. 30, 1923 |
| 1,853,319 | Polhemus | Apr. 12, 1932 |
| 2,095,745 | Hiatt | Oct. 12, 1937 |
| 2,143,994 | McGlone | Jan. 17, 1939 |
| 2,173,024 | Park | Sept. 12, 1939 |
| 2,213,483 | Benson | Sept. 3, 1940 |
| 2,307,914 | Bitney | Jan. 12, 1943 |
| 2,417,842 | Sanford | Mar. 25, 1947 |
| 2,531,684 | Jackson | Nov. 28, 1950 |
| 2,608,190 | Winning | Aug. 26, 1952 |
| 2,638,888 | Molla | May 19, 1953 |
| 2,666,425 | Hastings | Jan. 19, 1954 |

FOREIGN PATENTS

| Number | Country | Date |
|---|---|---|
| 1,311 | Great Britain | May 23, 1861 |